Nov. 8, 1966   G. J. O'ROURKE   3,284,264
METHOD OF MAKING A BELLOWS STRUCTURE OF THERMOSETTING MATERIAL
Filed March 1, 1965

INVENTOR.
Gerald J. O'Rourke
BY
Lawrence E. Slavik
Attorney

United States Patent Office 3,284,264
Patented Nov. 8, 1966

3,284,264
METHOD OF MAKING A BELLOWS STRUCTURE OF THERMOSETTING MATERIAL
Gerald J. O'Rourke, 2620 Anita Drive, Brookfield, Wis.
Filed Mar. 1, 1965, Ser. No. 439,514
7 Claims. (Cl. 156—289)

This is a continuation-in-part of application Serial Number 122,793 filed July 10, 1961, now abandoned.

The invention relates generally to bellows and an improved of manufacturing the bellows which is provided with bonded seams formed by fusing the material.

Bellows are frequently utilized for protecting machine elements that are associated with a movable member. Thus, movable members of machine tools may be driven along a base by a screw. In such mechanism the screw may be journalled in a base and have threaded engagement with a fixed nut mounted on the movable member. As the screw is rotated relative to the nut the movable member moves along the base. Since the movements must be normally performed with extreme accuracy, it is essential that the screw be protected from dirt. This can be conveniently accomplished by enclosing the screw in a bellows with one end of the bellows being attached to the base and the opposite end to the movable member. As the latter moves in one direction the bellows will expand to keep the screw covered along its entire exposed length and when the movable member moves in the opposite direction the bellows contracts to accommodate the movement. It has been the practice to manufacture such bellows of leather or other suitable flexible material and sew the edges together which is an expensive and time consuming operation.

It is therefore a general object to provide an improved bellows having fused seams.

Another object of the present invention is to provide an improved method of assembling a bellows.

Another object is to provide a method of assembling bellows which reduces the amount of labor required to a minimum.

Another object is to provide an improved method which greatly expedites the production of industrial bellows.

Another object is to provide an improved bellows with more flexibility and greater strength.

Another object is to provide a bellows with improved seams that more effectively seal the interior of the bellows from the atmosphere.

A further object is to provide a bellows of simple and inexpensive but sturdy construction and efficient in operation.

According to this invention the improved bellows is formed of an uncured or semicured thermosetting material such as natural or synthetic rubber and the parts of the bellows are bonded together by curing the material through the application of heat under pressure causing the contacting surfaces to fuse together and thereby form substantially air tight seams which are particularly well adapted to protect the interior of the bellows from the atmosphere.

The manufacture of such bellows is accomplished by stacking the several sections of the bellows together with separators or masks inserted between each section to partially separate the surfaces of the sections from each other. The masks are fabricated of a nonfusible material to prevent the bonding of the sections to each other except at the exposed areas which are not covered by the masks. Alternate masks are of different configurations so that one mask exposes the inner edges of the engaged surfaces of two adjacent bellows sections to permit them to contact each other while the next mask in the stack exposes the outer edges of the next pair of surfaces of the bellows sections with which it is engaged. The entire stack is then placed under pressure and heated sufficiently to vulcanize the entire stack of bellows sections and thereby cause the contacting surfaces of the bellows sections to fuse together to complete their assembly. After the bellows are cooled, the masks are removed and the bellows unit is ready for use.

The foregoing and other objects of the invention which will become apparent from the following detailed specification setting forth an illustrative embodiment, may be achieved by the particular apparatus and method depicted in and described in connection with the accompanying drawings, in which.

Figure 1:
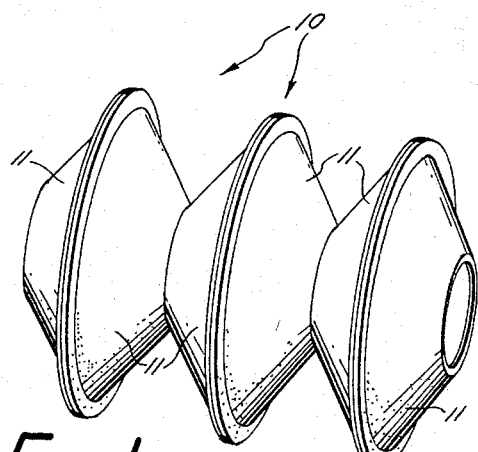
FIGURE 1 is a perspective view of a bellows constructed in accordance with the teachings of the present invention.

Reference is now made more particularly to the drawings and specifically to FIG. 1 thereof which illustrates a bellows constructed in accordance with the teachings of the present invention. The bellows shown as an illustrative embodiment is of circular configuration of the type that would be utilized for protecting a machine tool screw, a piston, connecting rod or the like. However, it should be understood that the advantages of the present invention can be applied as well to bellows of different sizes and shapes for other applications. For example, a U-shaped bellows may incorporate the teachings of the present invention, such U-shaped bellows being utilized for protecting the elongated way surfaces which support a movable member of a machine tool.

Figure 4:
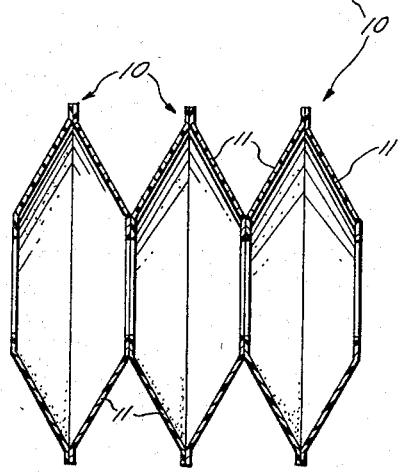
FIGURE 4 is a sectional view taken through the center of the bellows depicted in FIGURE 1.

The illustrated embodiment is a circular bellows formed of three units 10 with each unit being formed of two annular sections 11. The sections 11 are formed of a thermosetting material which can be bonded together by curing the material with the curing being accelerated by subjecting the material to elevated temperatures which will cause the contacting surfaces to fuse together. The successive sections 11 of the bellows are attached to each other by fusing the outer edge of each section 11 to the outer edge of the section 11 on one side of it and fusing its inner edge to the inner edge of the section 11 on the opposite side of it as clearly shown in FIGS. 1 and 4. This arrangement obviates the necessity of sewing the edges of the material together, as has been done in the past, and which is a time consuming operation. In addition, the fused bond of the operating edges of the sections 11 together creates an air-tight seal for better protecting the interior of the bellows from the atmosphere and it offers a superior construction for withstanding the strains developed by the continuous expansion and contraction of the bellows in operation.

The unique bellows structure of the present invention is obtained by means of a novel method of manufacture in which the several bellows sections 11 are stacked one upon another with protective masks or separators interspersed between each section to expose only that portion of the surface of the section which is to be vulcanized to the adjoining section. The entire stack is then placed under pressure and subjected to elevated temperatures for fusing the exposed surfaces together.

Figure 3:
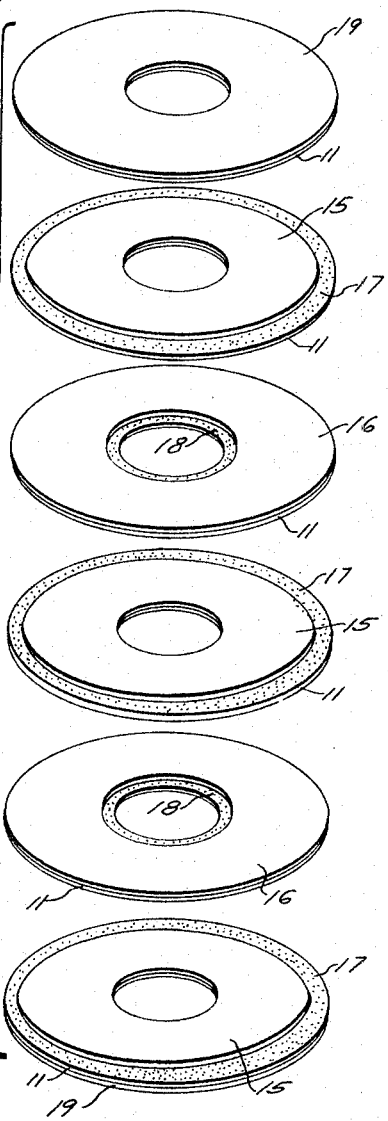
FIGURE 3 is an exploded perspective view of the several parts to illustrate the order in which they are stacked for placement in the press shown in FIG. 2.

The order of stacking the sections 11 is clearly shown in FIG. 3 where a small diameter mask 15 is shown as placed on the first section 11 from the bottom. The small diameter mask or separator 15 is of annular configuration generally similar to the configuration of the sections 11 but having a smaller outer diameter. The inner diameter of the smaller diameter mask 15 may be of the same size or smaller than the inner diameter of the section 11 so that only the outer edge of the section 11 is exposed. The remaining portion of the section 11 from the outer diameter of the mask 15 to the inner diameter of the section 11 is covered by the mask.

The mask 15 is formed of a material which is not affected by the heat to which the unit is subjected, such as paper, and will prevent the second section 11 from the bottom from bonding to the bottom section 11 along the area which is covered by the mask 15. As a result, when the entire stack is subjected to the elevated temperature, the outer edge of the second section 11 from the bottom will fuse with the outer edge of the bottom section 11 along the annular surface 17 exposed by the mask 15.

The succeeding section 11 which is illustrated as the second from the bottom in FIG. 3, is provided with a large diameter mask 16 on its upper surface. The large diameter mask is of annular configuration similar to the configuration of the sections 11 but having a larger inner diameter. Like the small mask 15 it is fabricated of paper or other material which is not affected by the heat to which the unit is subjected. The outer diameter of the large diameter mask 16 may be of the same size or larger than the the outer diameter of the sections 11. Accordingly, the large diameter mask 16 covers the entire top surface of the section 11 except for a small annular surface 18 along the inner diameter of the section. When the adjoining section 11, which is shown as the third from the bottom in FIG. 3, is placed upon the second section 11 from the bottom, the mask 16 will prevent their adjoining surfaces from contacting each other except along the annular area 18. When the entire stack is subjected to the elevated temperature, the two sections will fuse together only along the annular area 18 since the mask 16 will prevent such fusion along the remaining adjoining surfaces.

In like manner, the small diameter masks 15 and the large diameter masks 16 are placed on alternate sections 11 when stacking the sections so that one section 11 will have the annular surface 17 along its outer diameter exposed while the succeeding section 11 will have the smaller annular surface 18 along its inner diameter exposed for contact with the same area of the next section. A full mask 19, which covers the entire surface of the sections 11 is placed upon the top section 11 and underneath the bottom section 11, as shown in FIGURES 2 and 3, to prevent these sections from adhering to the plates of the press in which the sections will be held under pressure when heated.

When the sections 11 have been stacked one upon another with the masks 15 and 16 interposed between the sections 11 as described and the full masks 19 placed upon the top section 11 and beneath the bottom section 11, the entire stack is placed under pressure to hold the assembly together. Any type of apparatus capable of applying the required pressure may be utilized for this purpose, a simple press or clamping fixture being illustrated in FIG. 2 as an exemplary embodiment. Thus, the illustrated clamp comprises a top plate 24 and a bottom plate 25 movable relative to each other and guided in their movement by a pair of pins 26 which extend through suitable openings in both plates 24 and 25. A stud 27 is in threaded engagement with the bottom plate 25 and extends outwardly therefrom above the top plate 24. A nut 28 is threaded on the stud 27 to bear upon the upper surface of the top plate 24.

In order to apply the required pressure, the stack of sections 11 with their cooperating masks 15 and 16 is placed between the two plates 24 and 25 and the nut 28 is tightened against the top plate 24. While the stack of sections 11 is thus under pressure, it is subjected to an elevated temperature to accelerate a curing action that vulcanizes the entire stack of bellows. Such curing action will serve to fuse together those annular areas 17 and 18 which are not protected by the masks 15 and 16. The several sections 11 will then be fused together in the manner clearly depicted in FIGS. 1 and 4 to complete the illustrated bellows. The masks 15, 16 and 19 may then be removed and the bellows is ready to be placed in operation. If the large diameter masks are formed with an outer diameter larger than the outer diameter of the sections 11 they will be easier for the operator to grasp and remove when the bellows are completed. In like manner the removal of the small diameter masks will be facilitated if their inner diameter is smaller than the inner diameter of the sections 11.

Figure 2:
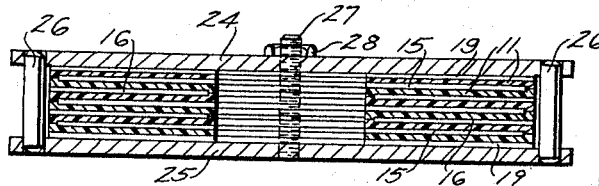
FIGURE 2 is a view in vertical section depicting the arrangement of the bellows sections with cooperating masks in a press in which they are heated for bonding the edges of the sections together.

The stack of sections 11 may be heated while under pressure by placing the stack and the clamping fixture illustrated in FIG. 2 into an oven which is heated to the required temperature to obtain the fusing action. Other types of clamping fixtures are available in which the plates 24 and 25 would be hinged and contain heating elements for obtaining the desired temperature without the necessity of utilizing a separate oven.

The sections 11 are formed of a thermosetting material such as natural or synthetic rubber. The material is formed into the sections 11 while it is in the uncured or semicured state. The sections are then assembled with the masks 15, 16 and 19 in the manner previously described and set in the press where the entire stack is placed under sufficient pressure to retain the adjacent surfaces in firm contact with each other. While thus held within the press, the entire stack is subjected to an elevated temperature so that the entire stack of bellows will cure in a relatively short period of time. When the curing is completed the adjacent surfaces of the sections 11 that are not separated by the masks are fused together into an integral structure that results in a superior product.

Depending upon the material being employed, the stacks are subjected to a temperature ranging from 100° F. to 500° F. and after the entire stack reaches the designated temperature, the curing process will be complete in from five to ten minutes. The type of thermosetting material utilized will depend upon the use to which the bellows will be subjected.

Thus, for heavy industrial use, as for example, to protect the members of a relatively large machine tool, it has been found to be very satisfactory to form the sections 11 of a heavy nylon material coated on both sides with semi-cured neoprene. When this material is utilized for fabricating the sections 11, the stack is placed under a pressure from 75 to 125 pounds per square inch and subjected to a temperature of 300° F. After the entire stack has been brought up to the temperature of 300° F. it is maintained at this temperature for five to ten minutes and the curing or vulcanizing process is completed. A normal bellows will require about two hours of heating before the temperature penetrates the entire stack. When an unusually long bellows is being manufactured, resulting in a relatively thick stack of sections 11, it may be necessary to increase the heating time to as much as three hours to bring the entire stack to the specified temperature of 300° F.

Since a thermosetting material is utilized for forming the bellows, the fusing of the junctures becomes permanent and when the cured material is subsequently heated, the heat may soften the structure somewhat but cannot restore the flowability that typifies the uncured or semicured material. Accordingly, subsequent heating will not weaken the junctures of adjacent sections 11 of the bellows so that the bellows will withstand the heat to which it may be subjected during operation.

From the foregoing detailed description of the structure and method of the illustrative embodiment of the present invention, it will be apparent that a new and improved bellows as well as an improved method of manufacturing such bellows has been provided in which the successive sections of the bellows are bonded together, not by a separate bonding agent, but by vulcanizing an uncured or semicured material of which the sections are fabricated to thereby cause the contacting surfaces along their appropriate edges to fuse together for obtaining the bellows structure. The invention therefore not only provides a superior bellows but provides a method of manufacture which requires a minimum of labor and radically expedites the manufacturing process to substantially reduce the cost of the resulting product.

Although the illustrative embodiment of the invention has been described in considerable detail for the purpose of making a full disclosure of a practical operative arrangement by means of which the invention may be practiced, it is to be understood that various novel features of the invention may be incorporated in other arrangements without departing from the spirit and scope of the invention as defined in the subjoined claims.

The principles of the invention having now been fully explained in connection with the foregoing description of embodying structure, I hereby claim as my invention:

1. The method of manufacturing bellows fabricated of a plurality of sections comprising; forming the individual sections of a flexible thermosetting uncured material; placing the several sections in a stack; placing masks between said sections, said masks being formed of a material that resists the heat to which the stack is subjected and being of such sizes and configurations as to expose those portions of each section which are to be bonded to adjoining sections; applying pressure to the stack of sections and masks for holding adjacent surfaces of the sections in firm contact with each other; and subjecting the stack while under pressure to sufficient heat to cure the material forming the sections and thereby fuse together adjoining sections along the areas which are exposed by said masks; whereby said sections are united in the proper relationship into an integral structure forming the bellows.

2. The method of manufacturing bellows comprising; stacking a plurality of bellows sections formed of a vulcanizable material; placing masks between said sections to separate the adjoining surfaces of said sections except those areas which are to be united to each other so that the adjoining surfaces along these areas are in contact, said masks being of a material that resists the heat to which the stack is subjected; applying pressure to the stack of sections and intervening masks; and subjecting the stack while under pressure to sufficient heat to vulcanize said material and thereby fuse together the surfaces of said sections which are in contact with each other; whereby said sections are united in the proper relationship into an integral structure forming the bellows.

3. The method of manufacturing bellows comprising; stacking a plurality of bellows sections formed of a flexible vulcanizable rubber; masking adjoining surfaces of said sections with a masking material that resists the heat to which the stack is subjected to separate the adjoining surfaces of said bellows sections except along those areas in which the adjoining surfaces are to be joined to each other; subjecting the stack to heat of a sufficient degree to vulcanize said rubber and thereby fuse together the surfaces of said sections which are in contact with each other; cooling said sections after they have been vulcanized; and removing the masking material after said sections have cooled; whereby said sections are joined in the proper relationship into an integral structure to form a bellows.

4. The method of manufacturing bellows comprising; stacking a plurality of bellows sections formed of a flexible semicured thermosetting material; placing small masks upon each alternate section in the stack so that the outer edge of the top surface of each of these alternate sections is exposed while the remaining surface of these sections is covered by said small masks; placing large masks upon the top surface of each of the alternate sections so that the inner edge of the top surface of each of these alternate sections is exposed while the remaining surface of these sections is covered by said large masks; applying pressure to the stack of sections and masks; and subjecting the stack while under pressure to heat to accelerate the curing of the material and thereby fuse together adjoining surfaces of said sections along the areas which are exposed by said masks; whereby said sections are united into an integral structure along the proper areas to form the bellows.

5. The method of manufacturing bellows comprising; stacking a plurality of bellows sections formed of semicured rubber; placing small paper masks upon each alternate section in the stack so that the outer edge of the top surface of each of these alternate sections is exposed while the remaining surface of these sections is covered by small masks; placing large paper masks upon the top surface of each of the other alternate sections so that the inner edge of top surface of each of these alternate sections is exposed while the remaining surface of these sections is covered by said large masks; applying a pressure of 75 to 125 pounds per square inch to the stack of sections and masks; and bringing the entire stack of sections and masks to a temperature of approximately 300° F. to cure the rubber and thereby fuse together adjoining surfaces of said sections along the areas which are exposed by said masks; whereby said sections are united into an integral structure along the proper areas to form the bellows.

6. The method of manufacturing bellows comprising; stacking a plurality of bellows sections formed of curable rubber; placing a mask between adjoining surfaces of said sections to prevent the adjoining surfaces from contacting each other except along those areas at which the adjoining surfaces are to be joined; and bringing the entire stack of sections and masks to a temperature of approximately 300° F. to cure the rubber and thereby fuse together adjoining surfaces of said sections along the areas which are exposed by said masks; whereby said sections are united into an integral structure along the proper areas to form the bellows.

7. The method of manufacturing bellows comprising; stacking a plurality of bellows sections formed of vulcanizable rubber; placing a mask between adjoining surfaces of said sections to prevent the adjoining surfaces from contacting each other except along those areas at which the adjoining surfaces are to be united; applying pressure to the stack of sections and masks sufficient to firmly hold adjoining surfaces together; bringing the entire stack of sections and masks to a temperature of approximately 300° F. and maintaining this temperature a sufficient length of time to vulcanize the rubber and thereby fuse together adjoining surfaces of said sections along the areas which are exposed by said masks; cooling the stack; and removing said masks after said sections have cooled; whereby said sections are united into an integral structure along the proper areas to form the bellows.

References Cited by the Examiner
UNITED STATES PATENTS

| | | | |
|---|---|---|---|
| 1,970,802 | 8/1934 | Johnson | 156—289 |
| 2,466,387 | 4/1949 | Curtis | 156—289 |
| 2,565,296 | 8/1951 | Chyle | 138—121 |
| 2,657,075 | 10/1953 | Schwester et al. | 138—121 |
| 2,703,770 | 3/1955 | Melzer | 156—290 XR |
| 2,920,656 | 1/1960 | Bertolet | 138—121 |

EARL M. BERGERT, *Primary Examiner.*

P. DIER, *Examiner.*